US007668110B2

(12) United States Patent
Seol et al.

(10) Patent No.: US 7,668,110 B2
(45) Date of Patent: Feb. 23, 2010

(54) METHOD OF DETERMINING REVERSE DATA RATE IN MOBILE COMMUNICATION SYSTEM

(75) Inventors: Jee Woong Seol, Gunpo-si (KR); Young Woo Yun, Seoul (KR); Ki Jun Kim, Seoul (KR); Soon Yil Kwon, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 616 days.

(21) Appl. No.: 10/843,562

(22) Filed: May 12, 2004

(65) Prior Publication Data

US 2004/0228287 A1 Nov. 18, 2004

(30) Foreign Application Priority Data

May 12, 2003 (KR) ............... 10-2003-0029966
May 12, 2003 (KR) ............... 10-2003-0029967

(51) Int. Cl.
*H04L 12/28* (2006.01)
(52) U.S. Cl. .............. 370/252; 370/328; 370/338; 370/465
(58) Field of Classification Search .......... 370/437, 370/468, 229, 230, 235, 252, 318, 328, 338, 370/465, 543–545, 538–540; 455/453, 63.1, 455/450
See application file for complete search history.

(56) References Cited

U.S. PATENT DOCUMENTS

| | | | |
|---|---|---|---|
| 5,923,650 A | 7/1999 | Chen et al. | ............ 370/331 |
| 6,112,101 A | 8/2000 | Bhatia et al. | ........... 455/512 |
| 6,219,343 B1 * | 4/2001 | Honkasalo et al. | ......... 370/335 |
| 6,611,794 B1 | 8/2003 | Fleming-Dahl | ........... 702/191 |
| 7,054,275 B2 * | 5/2006 | Kim et al. | ................ 370/252 |
| 2002/0015388 A1 * | 2/2002 | Kim et al. | ................ 370/252 |
| 2002/0077110 A1 | 6/2002 | Ishikawa et al. | ........... 455/452 |
| 2003/0067907 A1 * | 4/2003 | Rezaiifar et al. | ........... 370/349 |
| 2003/0081627 A1 | 5/2003 | Bao et al. | |
| 2003/0133415 A1 | 7/2003 | Kim et al. | |
| 2003/0152031 A1 * | 8/2003 | Toskala et al. | ............ 370/236 |
| 2004/0023661 A1 | 2/2004 | Pi et al. | ..................... 455/450 |
| 2004/0071125 A1 | 4/2004 | Gross et al. | |
| 2004/0223455 A1 * | 11/2004 | Fong et al. | ................ 370/229 |
| 2004/0223474 A1 * | 11/2004 | Kwon et al. | ................ 370/335 |
| 2004/0228287 A1 * | 11/2004 | Seol et al. | ................. 370/252 |
| 2004/0228349 A1 * | 11/2004 | Vrzic et al. | ............. 370/395.4 |

(Continued)

*Primary Examiner*—Seema S Rao
*Assistant Examiner*—Mon Cheri S Davenport
(74) *Attorney, Agent, or Firm*—Ked & Associates LLP (57) ABSTRACT

A method for determining a data rate for transmitting traffic data from a mobile station to a base station in a mobile communication system includes steps of receiving data rate control information from at least one base station; obtaining, based on the received data rate control information, a maximum transmittable data rate; obtaining a plurality of data rates for transmitting traffic data to the at least one base station, the plurality of data rates being obtained by considering a status factor of the mobile station; and determining the data rate of the traffic data to the at least one base station by selecting one of the obtained maximum transmittable data rate and plurality of data rates. The method determines the reverse data rate based on data rate control information and according to its own status, to provide system stability and minimize interference with other mobile stations while increasing the throughput for the sector and maintaining a desired QoS level even when the mobile station transmits at less power while.

19 Claims, 4 Drawing Sheets

U.S. PATENT DOCUMENTS

| | | | |
|---|---|---|---|
| 2004/0266451 A1* | 12/2004 | Stolyar et al. | 455/452.2 |
| 2005/0047393 A1* | 3/2005 | Liu | 370/352 |
| 2005/0088988 A1* | 4/2005 | Kwon et al. | 370/328 |
| 2005/0111379 A1* | 5/2005 | Kim et al. | 370/252 |
| 2005/0169301 A1* | 8/2005 | Jain et al. | 370/464 |
| 2006/0105796 A1* | 5/2006 | Malladi et al. | 455/522 |
| 2006/0121946 A1 | 6/2006 | Walton et al. | 455/561 |
| 2006/0264220 A1* | 11/2006 | Chen et al. | 455/454 |
| 2007/0070955 A1* | 3/2007 | Seol | 370/335 |

* cited by examiner

METHOD OF DETERMINING REVERSE DATA RATE IN MOBILE COMMUNICATION SYSTEM

CROSS-REFERENCE TO RELATED APPLICATIONS

This application claims the benefit of Korean Applications No. 10-2003-0029966 and No. 10-2003-0029967, each filed on May 12, 2003, which are hereby incorporated by reference.

BACKGROUND OF THE INVENTION

1. Field of the Invention

The present invention relates to a mobile communication system, and more particularly, to a method of determining a data rate when transmitting traffic data from a mobile station to a base station.

2. Discussion of the Related Art

In a contemporary mobile communication system, a specific mobile station of a sector transmitting at a high data rate causes serious interference with other mobile stations of the sector and destabilizes the system. Therefore, since a mobile station cannot arbitrarily determine a reverse-link data rate, the reverse data rate of each mobile station is regulated by the sector's base station, which transmits data rate control information generated based on the status of the respective mobile stations and the status of the reverse channel. Contemporary methods for determining reverse data rates, however, often exhibit poor system stability and fail to achieve the desired quality-of-service (QoS) for lower transmission levels.

SUMMARY OF THE INVENTION

Accordingly, the present invention is directed to a method of determining a reverse data rate in a mobile communication system that substantially obviates one or more problems due to limitations and disadvantages of the related art.

An object of the present invention is to provide a method of determining a reverse data rate in a mobile communication system, by which a mobile station determines the reverse data rate based on data rate control information transmitted from a base station and thus provides system stability.

Another object of the present invention is to provide a method of determining a reverse data rate in a mobile communication system, by which a mobile station determines the reverse data rate according to its own status and thus minimizes interference with other mobile stations.

Another object of the present invention is to provide a method of determining a reverse data rate in a mobile communication system, by which a desired QoS level is maintained even if a mobile station transmits at less power.

Another object of the present invention is to provide a method of determining a reverse data rate in a mobile communication system, by which a sector's mobile stations increase their respective throughputs.

Additional features and advantages of the invention will be set forth in the description which follows, and in part will be apparent to those having ordinary skill in the art upon examination of the following or may be learned from a practice of the invention. The objectives and other advantages of the invention will be realized and attained by the subject matter particularly pointed out in the specification and claims hereof as well as in the appended drawings.

To achieve these objects and other advantages in accordance with the present invention, as embodied and broadly described herein, there is provided a method of determining a reverse data rate in a mobile station. The method comprises steps of receiving data rate control information from at least one base station; obtaining, based on the received data rate control information, a maximum transmittable data rate; obtaining a plurality of data rates for transmitting traffic data to the at least one base station, the plurality of data rates being obtained by considering a status factor of the mobile station; and determining the data rate of the traffic data to the at least one base station by selecting one of the obtained maximum transmittable data rate and plurality of data rates.

Preferably, the method further comprises a step of combining the received data rate control information, so that, when the mobile station is in a handover condition with respect to a plurality of base stations, the mobile station adopts a single rate control bit (RCB) reflecting the data rate control information received from each base station. That is, when operated in a handoff area, a mobile station adopting the method of the present invention receives a plurality of rate control bits and other information and uses a known technique to generate one RCB by combining the control information received from each active sector.

In another aspect of the present invention, there is provided a method of determining a reverse data rate in a mobile station of a mobile communication system supporting a hybrid automatic repeat request (HARQ) transmission scheme. The method comprises steps of receiving data rate control information and retransmission control information from at least one base station; obtaining, based on the received data rate control information, a maximum combined data rate; determining a data rate of traffic data to be retransmitted according to the retransmission control information; obtaining a maximum transmittable data rate of traffic data to be newly transmitted to the at least one base station, the maximum transmittable data rate being obtained by considering the maximum combined data rate and the data rate of traffic data to be retransmitted; obtaining a plurality of data rates of the traffic data to be newly transmitted to the at least one base station, the plurality of data rates being obtained by considering a status factor of the mobile station; and determining the data rate of the traffic data to be newly transmitted to the at least one base station by selecting one of the obtained maximum transmittable data rate and plurality of data rates.

It is to be understood that both the foregoing explanation and the following detailed description of the present invention are exemplary and illustrative and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

Reference will now be made in detail to the preferred embodiment of the present invention, examples of which are illustrated in the accompanying drawings. Throughout the drawings, like elements are indicated using the same or similar reference designations.

The present invention relates to a mobile communication system supporting a hybrid automatic repeat request (HARQ) transmission scheme in which the base station generates retransmission control information, i.e., an acknowledgment (ACK) or non-acknowledgment (NACK) signal, for transmission to the mobile station based on the presence of errors in a previously received signal from the mobile station. Thus, the mobile station is conditionally informed of the need to retransmit reverse traffic data. That is, the base station transmits an ACK signal if retransmission is unnecessary, i.e., when no errors are detected in the received signal, and transmits a NACK signal if retransmission is necessary, i.e., when errors are detected.

Figure 1:
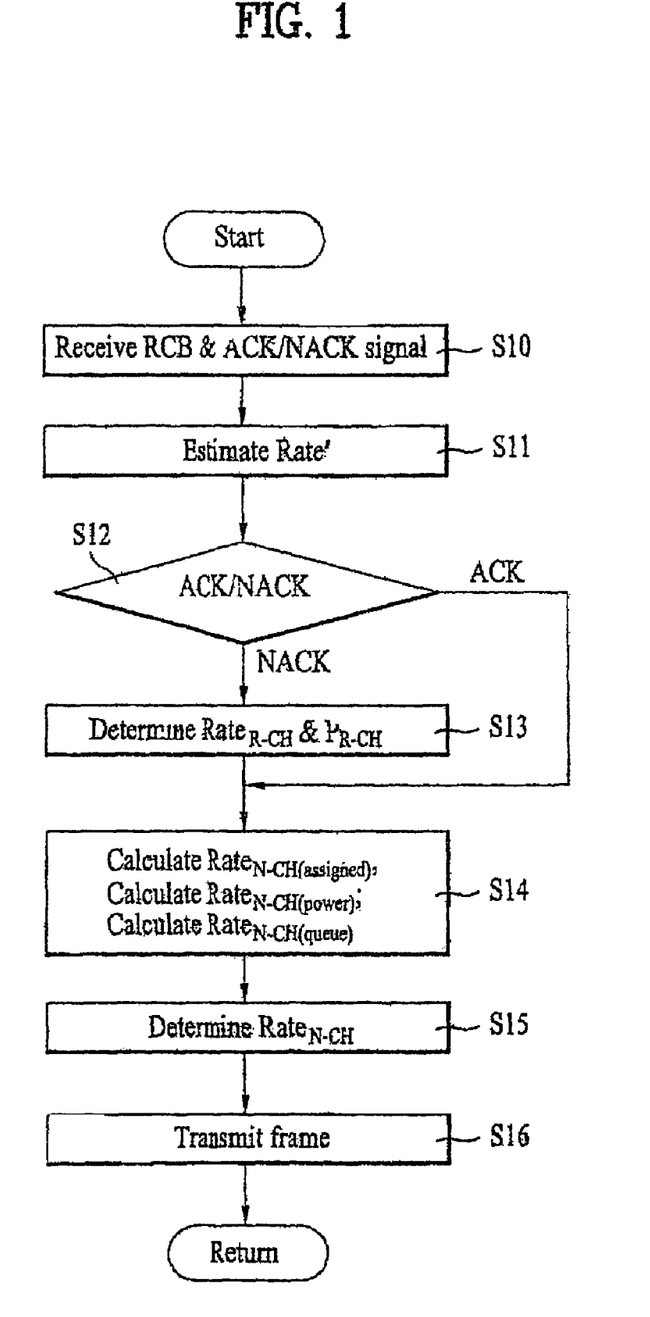
FIG. 1 is a flowchart of a method of determining a reverse data rate according to the present invention.

Referring to FIG. 1, illustrating a method of determining a reverse data rate according to the present invention, a mobile station receives in a step S10 data rate control information and retransmission control information from a base station. The data rate control information is in the form of a rate control bit or RCB.

A mobile station operated in a handoff area, i.e., in the coverage area of a plurality of base stations, receives corresponding pluralities of RCBs and ACK/NACK signals and therefore must combine the control information received from each active sector. Thus, a mobile station adopting the method of the present invention combines a plurality of RCBs, transmitted from each of a plurality of sectors, to generate one RCB.

Figure 2:
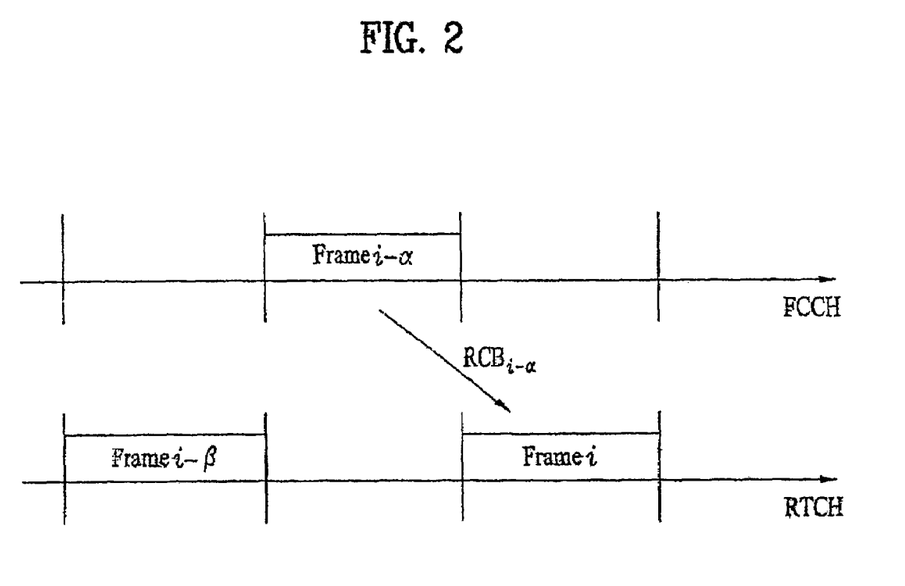
FIG. 2 is a diagram of a forward control channel and a reverse traffic channel, illustrating a reverse data rate determination according to the method of FIG. 1.
Figure 3:
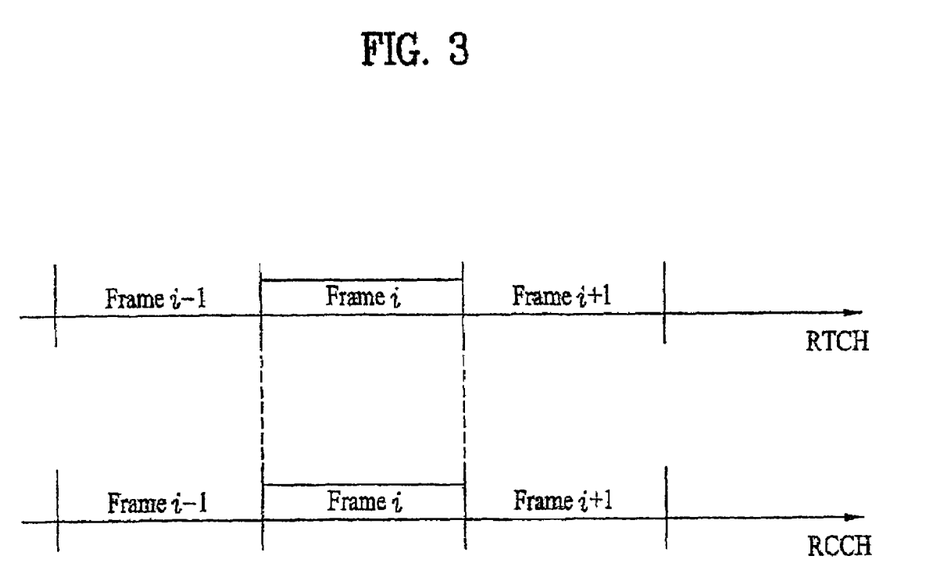
FIG. 3 is a diagram of a reverse traffic channel separated for supporting a HARQ transmission scheme applied to the method of the present invention.

Referring to FIG. 2, illustrating the relative timing between a reverse traffic channel (RTCH) and a forward control channel (FCCH), data rate control information (one RCB) is transmitted from a base station at an (i-α)th frame of the forward control channel. The RCB instruction value, i.e., an "up," "down," or "hold" instruction, is determined in a base station using an algorithm for optimizing system operation, and a mobile station references the received instruction to control the data rate of an ith frame accordingly. As shown in FIG. 3, the data transmission and processing between the mobile station and the base stations inherently incurs a time delay α in the forward control channel and a time delay β in the reverse traffic channel, each type of delay occurring in full frames. According to the present invention, the retransmission control information (ACK/NACK) may be multiplexed with the data rate control information (RCB), to be transmitted together via the forward control channel, or may be transmitted via a separate channel.

Referring again to FIG. 1, the mobile station estimates in a step S11 a combined data rate $Rate_i'$, which is based on the received data rate control information ($RCB_i$) and is the maximum rate permitted by the base station for the ith frame. The "combined" data rate supports a HARQ transmission scheme, in which traffic data (packets) is retransmitted via an $RTCH_{R-CH}$ channel in response to a NACK signal and is newly transmitted via an $RTCH_{N-CH}$ channel in response to an ACK signal. Accordingly, the mobile station controls its reverse-link data rate based on the maximum permitted rate ($Rate_i'$) such that the actual data rate of data transmitted at the ith frame, represented herein as $Rate_i$, satisfies the relation $Rate_i \leq Rate_i'$. The value of $Rate_i'$ is estimated using a value λ, which is determined based on the received data rate control information (RCB) and indicates a degree of increment (e.g., an n-step) or decrement (e.g., an m-step) of the data rate of the ith frame with respect to the date rate of an (i-β)th frame, designated as $Rate_{i-\beta}$. The value of $Rate_i'$ is always greater than or equal to the value (AutoMaxRate) of the mobile station's initial data rate, which is a lower limit determined according to signaling information, to prevent the mobile station from initiating data transmission at a data rate that is too low.

FIG. 3 illustrates a structure of a reverse traffic channel, including the above-mentioned $RTCH_{R-CH}$ and $RTCH_{N-CH}$ channels, in which a reverse transmission channel is separated using a code-division or time-division technique for supporting the HARQ scheme. For example, upon receiving a NACK signal from the base station for a given packet, the mobile station retransmits the packet via the $RTCH_{R-CH}$ channel at a $Rate_{R-CH(i)}$ and at a transmission power $P_{R-CH}$; upon receiving an ACK signal from the base station for a given packet, the mobile station transmits a new packet via the $RTCH_{N-CH}$ channel at a $Rate_{N-CH(i)}$ and at a transmission power $P_{N-CH}$. As an alternative to a separate channel configuration, a mobile station may perform new transmissions and retransmissions using the same reverse transmission channel when responding to the retransmission control information from a base station, whereby retransmissions continue until receipt of an ACK signal, whereupon new packets are transmitted on the same channel.

Figure 4:
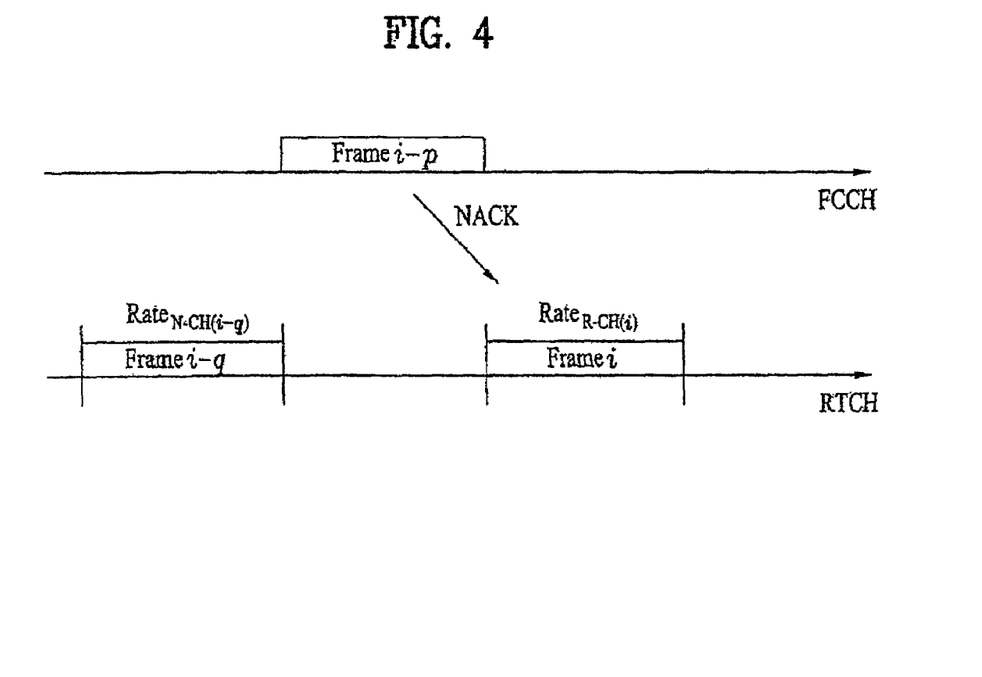
FIG. 4 is a diagram of a channel configuration supporting HARQ transmission, illustrating a reverse transmission channel (RTCH) and a forward control channel (FCCH) transmitting a NACK signal in accordance with the method of the present invention.

FIG. 4, illustrating a channel configuration supporting HARQ transmission, demonstrates the resulting time delays in a reverse transmission channel (RTCH) and a forward control channel (FCCH) for transmitting automatic repeat request (ARQ) information. As shown in FIG. 4, the data transmission and processing between the mobile station and the base stations inherently incurs a time delay p in the forward control channel and a time delay q in the reverse traffic channel, each type of delay occurring in full frames.

In the example of FIG. 4, a NACK signal is generated in response to the transmission of a packet at a frame i-q, and a mobile station determines the data rate of the traffic data to be retransmitted at a frame i according to the ARQ information corresponding to the (i-q)th frame. The ARQ information is received from the base station in the form of an ACK signal indicating reception success or a NACK signal indicating reception failure. That is, if the base station successfully receives a frame transmitted via the $RTCH_{N-CH}$ channel at the (i-q)th frame, the mobile station need not retransmit the traffic data via the $RTCH_{R-CH}$ channel. On the other hand, the base station transmits to the mobile station a NACK signal at an (i-p)th frame corresponding to an unsuccessfully received frame, e.g., the (i-q)th frame, and the mobile station sets the date rate for retransmission at the ith frame equal to that of the frame generating the NACK signal ($Rate_{R-CH(i)} = Rate_{N-CH(i-q)}$).

Accordingly, with reference to the channel configuration of FIG. 4, it is determined in a step S12 of FIG. 1 whether the retransmission control information received in the step S10 is an ACK signal or a NACK signal, and a step S13 is performed only when a NACK signal is received (ARQ=NACK), whereupon the data rate of the $RTCH_{R-CH}$ channel is determined for the ith frame, designated herein as $Rate_{R-CH(i)}$, thus setting the value of $\text{Rate}_{R-CH(i)}$ equal to $\text{Rate}_{R-CH(i-q)}$. Since there is no retransmission when an ACK signal is received (ARQ=ACK), rendering the above rate determination unnecessary, performance of the step S13 is omitted and the value of $\text{Rate}_{R-CH(i)}$ may be set to zero or a similar null value.

The transmission power of the $\text{RTCH}_{R-CH}$ channel at the ith frame can be expressed by Equation 1.

$$P_{R-CH(i)} = rP_{Tr}[\text{Rate}_{R-CH(i)}] \qquad \text{[Equation 1]}$$

where $P_{Tr[Rate]}$ is the transmission power of traffic information required for a specific "Rate" and where the value of r is between zero and one, to effect an energy reduction, since the transmission power of a frame retransmitted via the $\text{RTCH}_{R-CH}$ channel is r-times higher than that necessary for the frame generating the NACK signal.

With the values of $\text{Rate}_{R-CH(i)}$ and $P_{R-CH(i)}$ thus determined, the data rate of traffic data to be newly transmitted via the $\text{RTCH}_{N-CH}$ channel, designated herein as $\text{Rate}_{N-CH}$, is determined by considering three factors, namely, the maximum data rate of the $\text{RTCH}_{N-CH}$ channel, i.e., $\text{Rate}_{N-CH(assigned)}$, the maximum transmission power of the mobile station, i.e., $\text{Rate}_{N-CH(power)}$, and the volume of queued traffic data to be transmitted by the mobile station, i.e., $\text{Rate}_{N-CH(queue)}$. That is, a step S14 performs separate calculations as follows, and a step S15 is performed to select an optimal value among three obtained values.

The value of the first factor, $\text{Rate}_{N-CH(assigned)}$, is the maximum data rate of the $\text{RTCH}_{N-CH}$ channel, which is based on the transmission power to be allocated (assigned) for achieving transmission at the $\text{Rate}_{N-CH}$. This is expressed by Equation 2 as follows.

$$\text{if } P_{R-CH(i)} > \tau P_{Tr}[\text{Rate}'_i], \text{ then } \text{Rate}_{N-CH(assigned)(i)} = 0; \text{ else} \qquad \text{[Equation 2]}$$

$$\text{Rate}_{N-CH(assigned)(i)} = \underset{R \in RateSet}{\arg \min} \{R: P_{Tr}[R] + P_{R-CH(i)} \leq \tau P_{Tr}[\text{Rate}'_i]\}$$

where R is an arbitrary data rate in a data rate set commonly shared by the base station and the mobile station, wherein a maximum R satisfying $P_{Tr}[R] + P_{R-CH(i)} \leq \tau P_{Tr}[\text{Rate}'_i]$ is set as the value of $\text{Rate}_{N-CH(assigned)(i)}$, and where $\tau$ is greater than or equal to one and is the ratio of the additionally available transmission power to the transmission power required for the maximum combined data rate Rate' permitted by the base station.

Equation 2 finds the data rate of the $\text{RTCH}_{N-CH}$ channel by considering the total transmission power allocated for the maximum combined data rate Rate' permitted by the base station and the additionally available transmission power. The maximum data rate R is decided by $\text{Rate}_{N-CH(assigned)(i)}$ in a manner that the sum of the transmission power of the $\text{RTCH}_{R-CH}$ channel by Equation 2 and the transmission power that will be allocated to N-CH is made not to exceed $\tau$-times of the transmission power allocated for the maximum combined data rate Rate' allowed by the base station.

The value of the second factor, $\text{Rate}_{N-CH(power)}$, is the data rate determined for the maximum transmission power of the mobile station and an available transmission power for inner loop power control of the base station, as shown in Equations 3-7. The value of $\text{Rate}_{N-CH(power)}$ is determined as a maximum rate R satisfying Equation 7.

Figure 5:
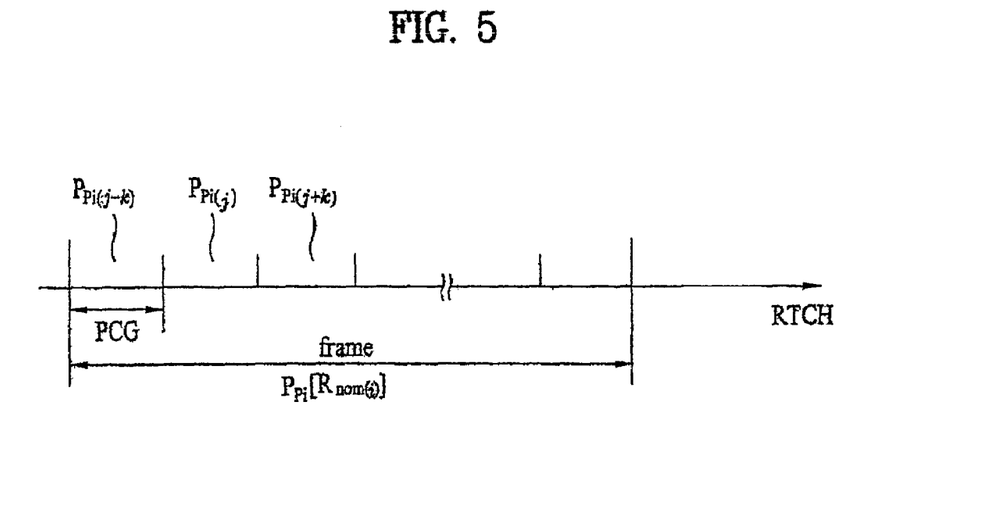
FIG. 5 is a diagram of a power control section of a pilot signal over a reverse transmission channel in accordance with the method of the present invention.

Referring to FIG. 5, illustrating a power control section of a pilot signal over a reverse transmission channel according to the present invention, the transmission power of a reverse pilot signal is adjusted by a forward power control bit according to an inner loop power control algorithm. According to Equation 3, the mean-normalized transmission power of the pilot signal ($P_{PiNormAv(k)}$) is calculated by power control groups (PCGs) for which the pilot signal's transmission power varies but may be found in various other ways.

$$P_{PiNormAv(k)} = C_{Tx}\left(\frac{P_{Pi(k)}}{P_{Pi}[R_{nom(i)}]}\right) + P_{PiNormAv(k-1)}(1 - C_{Tx}) \qquad \text{[Equation 3]}$$

where $C_{Tx}$ is a coefficient of a primary filter and is a value between zero and one; where $P_{Pi(k)}$ is the actually transmitted power of the pilot signal at the kth power control group; where $P_{Pi[Rate]}$ is the transmission power of a pilot signal for the data rate required for traffic transmitted via a reverse transmission channel, namely, $\text{RTCH}_{N-CH}$ or $\text{RTCH}_{R-CH}$; and where $R_{nom(i)}$ is the nominal data rate at the ith frame and is found by Equation 5.

$$R_{nom(i)} = \qquad \text{[Equation 4]}$$
$$\underset{R \in RateSet}{\arg \min}\{R: P_{Tr}[\text{Rate}_{N-CH(i-\alpha)}] + P_{R-CH(i-\alpha)} \leq \tau P_{Tr}[R]\}$$

According to Equation 4, the value of $R_{nom(i)}$ determined as a minimum R such that a sum of transmission powers of the $\text{RTCH}_{R-CH}$ and $\text{RTCH}_{N-CH}$ channels is less than or equal to a ratio of the total transmission power to the power available.

The mean-normalized transmission power of the pilot signal is calculated for by frames using Equation 5.

$$P_{PiNormAv(i)} = P_{PiNormAv(k+(n-1))} \qquad \text{[Equation 5]}$$

where k indicates the location of the final power control group (PCG) of the ith frame and where n is an offset value of the final power control group with respect to the current frame.

The value of $\text{Rate}_{N-CH(power)}$ is set to zero if Equation 6 is satisfied and is otherwise determined by Equation 7. In other words, $\text{Rate}_{N-CH(power)}$ is zero when the above-decided values of $\text{Rate}_{R-CH}$ and $P_{R-CH}$ (in step S13) satisfy Equation 6.

$$\text{if } P_{PiNormAv(i-1)}P_{Pi}[R_{nom}(0, \text{Rate}_{R-CH(i)})] + P_{CHother(i)} + \qquad \text{[Equation 6]}$$
$$P_{R-CH(i)} > \frac{P_{max}}{\text{Headroom}_{Tx}}, \text{ then } \text{Rate}_{N-CH(power)} = 0$$

$$R_{N-CH(power)} = \qquad \text{[Equation 7]}$$
$$\underset{R \in RateSet}{\arg \min}\left\{\begin{array}{l} P_{PiNormAv(i-1)}P_{Pi}[R_{nom}(R, \text{Rate}_{R-CH(i)})] + \\ P_{Tr}[R] + P_{CHother(i)} + P_{R-CH(i)} \leq \frac{P_{max}}{\text{Headroom}_{Tx}} \end{array}\right\}$$

In Equations 6 and 7, $P_{CHother(i)}$ is the power of other reverse transmission channels of the mobile station at the ith frame, $P_{max}$ is a maximum power that the mobile station can transmit, and $\text{Headroom}_{Tx}$ is an available transmission power ratio for operation of the inner loop power control. The transmission powers of the mobile station's other reverse-link channels are considered in addition to the transmission power of the $\text{RTCH}_{R-CH}$ channel, to determine the data rate of the $\text{RTCH}_{N-CH}$ channel for the maximum transmission power of the mobile station and the additionally available transmission power for the inner loop power control. The transmission power of the pilot signal satisfying transmission requirements of the $RTCH_{R\text{-}CH}$ and $RTCH_{N\text{-}CH}$ channels simultaneously should be considered as well.

The value of $R_{nom(R_1, R_2)}$ in Equations 6 and 7 can be defined by Equation 8.

$$R_{nom(R_1,R_2)} = \arg\min_{R \in RateSet}\{R: P_{Tr}[R_1] + rP_{Tr}[R_2] \leq \tau P_{Tr}[R]\} \quad \text{[Equation 8]}$$

The value of the third factor, $Rate_{N\text{-}CH(queue)}$, is a volume ($Queue_i$) of traffic information that the mobile station has at the ith frame and is determined based on a buffer state of the mobile station.

If a value resulting from dividing a volume of data occupying the buffer by a first buffer management variable $Q_{Tx1}$ is less than or equal to a Payload size of an initial data rate, the value of $Rate_{N\text{-}CH(queue)}$ is determined as a minimum rate R among data rates having payload sizes greater than or equal to a value resulting from dividing the volume of the data occupying the buffer by a second buffer management variable $Q_{Tx2}$. On the other hand, if the value resulting from dividing the volume of the data occupying the buffer by the first buffer management variable $Q_{Tx1}$ is greater than the payload size of the initial data rate, the value of $Rate_{N\text{-}CH(queue)}$ is determined as a minimum rate R among data rates having payload sizes greater than or equal to a value resulting from dividing the volume of the data occupying the buffer by the first buffer management variable $Q_{Tx1}$. Here, $Q_{Tx1}$ and $Q_{Tx2}$ are variables for managing a volume of a buffer and each have a value of at least one, where $Q_{Tx1}$ is greater than $Q_{Tx2}$.

The value of $Rate_{N\text{-}CH(queue)}$ follows Equation 10 if the buffer state satisfies Equation 9 and otherwise follows Equation 11. Namely, if the value resulting from dividing the volume of the data occupying the buffer by the $Q_{Tx1}$ is less than or equal to a Payload size of the initial data rate (AutoMaxRate), the value of $Rate_{N\text{-}CH(queue)}$ is determined as a minimum data rate satisfying Equation 10. The initial data rate is the minimum data rate set up to prevent the mobile station from initiating data transmission at a data rate that is too low. Yet, if the value resulting from dividing the volume of the data occupying the buffer by the $Q_{Tx1}$ exceeds the Payload size of the initial data rate (AutoMaxRate), the value of $Rate_{N\text{-}CH(queue)}$ is determined as a minimum data rate satisfying Equation 11.

$$\frac{Queue_i}{Q_{Tx1}} \leq Payload[AutoMaxRate] \quad \text{[Equation 9]}$$

$$Rate_{N\text{-}CH(queue)(i)} = \arg\min_{R \in RateSet}\left\{R: Payload[R] \geq \frac{Queue_i}{Q_{Tx2}}, R \leq AutoMaxRate\right\} \quad \text{[Equation 10]}$$

$$Rate_{N\text{-}CH(queue)(i)} = \arg\min_{R \in RateSet}\left\{R: Payload[R] \geq \frac{Queue_i}{Q_{Tx}}\right\} \quad \text{[Equation 11]}$$

The smallest value among the data rates of the $RTCH_{N\text{-}CH}$ channel respectively obtained according to the three factors of $Rate_{N\text{-}CH(assigned)}$, $Rate_{N\text{-}CH(power)}$, and $Rate_{N\text{-}CH(queue)}$ is selected as the $Rate_{N\text{-}CH}$ (step S15).

According to Equation 12, the value of $Rate_{N\text{-}CH}$ may be determined as the smallest value among $f_1 Rate_{N\text{-}CH(assigned)}$, $f_2 Rate_{N\text{-}CH(power)}$, and $f_3 Rate_{N\text{-}CH(queue)}$, where f1, f2, and f3 are respective weights of the selected data rate. That is, a weight is assigned to each of three data rates, and the one having the smallest assigned weight is determined as the data rate of traffic data to be newly transmitted.

$$Rate_{N\text{-}CH(i)} = \min\{f_1 Rate_{N\text{-}CH(assigned)}, f_2 Rate_{N\text{-}CH(power)}, f_3 Rate_{N\text{-}CH(queue)}\} \quad \text{[Equation 12]}$$

In transmitting a frame via the reverse transmission channel, to enable the base station to receive the frame with a quality over a predetermined level, the mobile station should consider various factors so that the smallest data rate among the data rates of the $RTCH_{N\text{-}CH}$ channel determined according to the factors is set as the data rate of the corresponding frame of the $RTCH_{N\text{-}CH}$ channel. The thus-set value of $Rate_{N\text{-}CH}$ is used in updating $R_{nom}$ per Equation 4. By referring to the data rates determined for the $RTCH_{R\text{-}CH}$ and $RTCH_{N\text{-}CH}$ channels, the buffer state (queue) of the mobile station is updated and the transmission of the corresponding frame begins in a step S16 based on the determined data rates. The mean-normalized transmission power of the pilot signal for the $RTCH_{R\text{-}CH}$ and $RTCH_{N\text{-}CH}$ channels ($P_{PiNormAv(i)}$ of Equation 3) is updated each PCG using the updated $R_{nom}$, and transmission of the frame is terminated.

In determining mobile station status information (the mobile station's buffer information, data rate information, etc.) for generating the rate control bit, the base station or mobile station refers to the mobile station state information of an (i-b)th frame for generating data rate control information that will be transmitted on an (i-a)th frame, where a and b are natural numbers and a is smaller than b.

The mobile station transmits via the reverse control channel information, i.e., a mobile station information bit (MSIB), for informing the base station of the mobile station's current status. The MSIB may be set to "increase" or "hold." By setting up a data rate to be one step higher based on $R_{nom(i)}$, it is determined whether the $Rate_{N\text{-}CH(power)}$ and $Rate_{N\text{-}CH(queue)}$ data rates are permissible. If a higher data rate can be set for transmission, the MSIB is set to "increase" and is then transmitted to the base station.

According to Equation 13, an $R_{req(i)}$ value is incremented to be set to the data rate one-step higher than $R_{nom(i)}$, and the MSIB is set based on whether the incremented $R_{req(i)}$ value satisfies Equations 14 and 15. That is, the MSIB is set to "increase" when $R_{req(i)}$ satisfies both equations and is otherwise set to "hold."

$$R_{req(i)} = R_{nom(i)} + \Delta_{Rate} \quad \text{[Equation 13]}$$

$$P_{PiNormAv(i)} = P_{Pi}[R_{req(i)}] + P_{Tr}[R_{req(i)}] + P_{CHother} \leq \frac{P_{max}}{Headroom_{req}} \quad \text{[Equation 14]}$$

$$Payload[R_{req(i)}] \geq \frac{Queue_i}{Q_{req}} \quad \text{[Equation 15]}$$

Accordingly, the method of the present invention determines a reverse data rate when a data rate control algorithm is applied to a reverse-link channel. The data rate is determined based on data rate control information from the base station, thereby stabilizing the system. Moreover, the present invention determines a data rate suitable for the state of a mobile station, enabling a minimizing of interference with other mobile stations. Therefore, QoS levels are satisfied even if a mobile station uses less power, thereby reducing power consumption and increasing throughput.

It will be apparent to those skilled in the art that various modifications and variations can be made in the present invention without departing from the spirit or scope of the invention. Thus, it is intended that the present invention embody such modifications and variations, provided they come within the scope of the appended claims and their equivalents.

What is claimed is:

1. A method of determining a reverse data rate in a mobile station, the method comprising:
   receiving data rate control information from at least one base station;
   obtaining, based on the received data rate control information, a maximum transmittable data rate;
   obtaining a plurality of data rates for transmitting traffic data to the at least one base station, each of the plurality of data rates being obtained by considering a status factor of the mobile station, the status factor of the mobile station including at least one of a transmission power additionally available to the mobile station or a volume of queued traffic data to be transmitted; and
   determining the data rate of the traffic data to be transmitted from the mobile station to the at least one base station by selecting a minimum data rate among the obtained maximum transmittable data rate and the plurality of data rates,
   wherein, if a value resulting from dividing a volume of data occupying a traffic buffer of the mobile station by a first buffer management variable is not greater than a payload size of an initial data rate, a $\text{Rate}_{N\text{-}CH(queue)}$ is set as a lowest rate R among data rates having payload sizes of not less than a value resulting from dividing the volume of data occupying the traffic buffer by a second buffer management variable, the $\text{Rate}_{N\text{-}CH(queue)}$ being a data rate of traffic data to be newly transmitted and being determined by considering the volume of traffic data to be transmitted.

2. The method as claimed in claim 1, wherein the mobile station is in a handover condition with respect to a plurality of base stations, the mobile station receiving data rate control information from each base station.

3. The method as claimed in claim 2, further comprising: combining the received data rate control information to generate one rate control bit.

4. The method as claimed in claim 1, wherein the maximum transmittable data rate is set to a predetermined value (AutoMaxRate) if the maximum transmittable data rate is determined to be less than the predetermined value.

5. The method as claimed in claim 1, wherein the at least one base station transmits retransmission control information according to a hybrid automatic repeat request (HARQ) transmission scheme.

6. The method as claimed in claim 5, wherein, if the transmitted retransmission control information is a NACK signal, the traffic data is retransmitted to the at least one base station and a data rate of the traffic data to be retransmitted is set equal to the data rate of a frame generating the NACK signal.

7. The method as claimed in claim 5, wherein retransmitted traffic data is transmitted at a lower power than that of the frame generating the NACK signal.

8. A method of determining a reverse data rate in a mobile station, the method comprising:
   receiving data rate control information from at least one base station;
   obtaining, based on the received data rate control information, a maximum transmittable data rate;
   obtaining a plurality of data rates for transmitting traffic data to the at least one base station, each of the plurality of data rates being obtained by considering a status factor of the mobile station, the status factor of the mobile station including at least one of a transmission power additionally available to the mobile station or a volume of queued traffic data to be transmitted; and
   determining the data rate of the traffic data to be transmitted from the mobile station to the at least one base station by selecting a minimum data rate among the obtained maximum transmittable data rate and the plurality of data rates,
   wherein, if a value resulting from dividing a volume of data occupying a traffic buffer of the mobile station by a first buffer management variable is greater than a payload size of an initial data rate, a $\text{Rate}_{N\text{-}cH(queue)}$ is set as a lowest rate R among data rates having payload sizes of not less than a value resulting from dividing the volume of data occupying the traffic buffer by the first buffer management variable, the $\text{Rate}_{N\text{-}CH(queue)}$ being a data rate of traffic data to be newly transmitted and being determined by considering the volume of traffic data to be transmitted.

9. The method as claimed in claim 1, wherein the rate R is one of a rate set commonly shared by the mobile station or the at least one base station.

10. A method of determining a reverse data rate in a mobile station of a mobile communication system supporting a hybrid automatic repeat request (HARQ) transmission scheme, the method comprising:
    receiving data rate control information and retransmission control information from at least one base station;
    obtaining, based on the received data rate control information, a maximum combined data rate;
    determining a data rate of traffic data to be retransmitted according to the retransmission control information;
    obtaining a maximum transmittable data rate of traffic data to be newly transmitted to the at least one base station, the maximum transmittable data rate being obtained by considering the maximum combined data rate and the data rate of traffic data to be retransmitted;
    obtaining a plurality of data rates of the traffic data to be newly transmitted to the at least one base station, each of the plurality of data rates being obtained by considering a status factor of the mobile station, the status factor of the mobile station including at least one of a transmission power additionally available to the mobile station or a volume of queued traffic data to be transmitted; and
    determining the data rate of the traffic data to be newly transmitted from the mobile station to the at least one base station by selecting a minimum data rate among the obtained maximum transmittable data rate and the plurality of data rates,
    wherein the determined data rate of the traffic data to be newly transmitted to the at least one base station is a highest rate R satisfying $$P_{Tr}[R] + P_{R\text{-}CH(i)} \leq \tau P_{Tr}[Rate_i']$$

where $P_{Tr[rate]}$ is transmission power required for a specific "Rate," where $P_{RCH(i)}$ is transmission power allocated to the traffic data to be retransmitted, where $\text{Rate}_i'$ is the maximum combined data rate, and where $\tau$ is greater than or equal to one.

11. The method as claimed in claim 10, wherein the mobile station is in a handover condition with respect to a plurality of base stations, the mobile station receiving data rate control information from each base station.

12. The method as claimed in claim 11, further comprising combining the received data rate control information.

13. The method as claimed in claim 10, wherein the maximum transmittable data rate is set to a predetermined value (AutoMaxRate) if the maximum transmittable data rate is determined to be less than the predetermined value.

14. The method as claimed in claim 10, wherein, if the transmitted retransmission control information is a NACK signal, the traffic data is retransmitted to the at least one base station and a data rate of the traffic data to be retransmitted is set equal to the data rate of a frame generating the NACK signal.

15. The method as claimed in claim 10, wherein the retransmitted traffic data is transmitted at a lower power than that of the frame generating the NACK signal.

16. A method of determining a reverse data rate in a mobile station of a mobile communication system supporting a hybrid automatic repeat request (HARQ) transmission scheme, the method comprising:
receiving data rate control information and retransmission control information from at least one base station;
obtaining, based on the received data rate control information, a maximum combined data rate;
determining a data rate of traffic data to be retransmitted according to the retransmission control information;
obtaining a maximum transmittable data rate of traffic data to be newly transmitted to the at least one base station, the maximum transmittable data rate being obtained by considering the maximum combined data rate and the data rate of traffic data to be retransmitted;
obtaining a plurality of data rates of the traffic data to be newly transmitted to the at least one base station, each of the plurality of data rates being obtained by considering a status factor of the mobile station, the status factor of the mobile station including at least one of a transmission power additionally available to the mobile station or a volume of queued traffic data to be transmitted; and
determining the data rate of the traffic data to be newly transmitted from the mobile station to the at least one base station by selecting a minimum data rate among the obtained maximum transmittable data rate and the plurality of data rates,
wherein, if a value resulting from dividing a volume of data occupying a traffic buffer of the mobile station by a first buffer management variable is not greater than a payload size of an initial data rate, a $\text{Rate}_{N\text{-}CH(queue)}$ is set as a lowest rate R among data rates having payload sizes of not less than a value resulting from dividing the volume of data occupying the traffic buffer by a second buffer management variable, the $\text{Rate}_{N\text{-}CH(queue)}$ being a data rate of traffic data to be newly transmitted and being determined by considering the volume of traffic data to be transmitted.

17. The method as claimed in claim 10, wherein, if a value resulting from dividing a volume of data occupying a traffic buffer of the mobile station by a first buffer management variable is greater than a payload size of an initial data rate, a $\text{Rate}_{N\text{-}CH(queue)}$ is set as a lowest rate R among data rates having payload sizes of not less than a value resulting from dividing the volume of data occupying the traffic buffer by the first buffer management variable, the $\text{Rate}_{N\text{-}CH(queue)}$ being a data rate of traffic data to be newly transmitted and being determined by considering the volume of traffic data to be transmitted.

18. The method as claimed in claim 10, wherein the selected data rate is the data rate of the traffic data to be newly transmitted, by considering a transmission power additionally available to the mobile station, based on a maximum rate R satisfying $$P_{PiNormAv(i-1)} P_{Pi}\left[R_{nom}\left(R, \text{Rate}_{R\text{-}CH(i)}\right)\right] + P_{Tr}[R] + P_{CHother(i)} + P_{R\text{-}CH(i)} \le \frac{P_{max}}{Headroom_{Tx}}$$

where $P_{PiNormAv(i-1)}$ is a mean-normalized transmission power of a pilot signal at an ith frame, where $P_{Pi[Rate]}$ is a transmission power of the pilot signal for the data rate required for traffic data transmitted via a reverse transmission channel, where $P_{CHother(1)}$ is the power of other reverse transmission channels of the mobile station at the ith frame, where $P_{Tr[rate]}$ is the transmission power of traffic information required for a specific "Rate," where $P_{max}$ is a maximum power that the mobile station can transmit, and where $Headroom_{Tx}$ is an available transmission power ratio for operation of an inner loop power control.

19. The method as claimed in claim 16, wherein the rate R is one of a rate set commonly shared by the mobile station or the at least one base station.

* * * * *